(12) United States Patent
Hartzsch

(10) Patent No.: US 6,285,156 B1
(45) Date of Patent: Sep. 4, 2001

(54) SENSORLESS STEP RECOGNITION PROCESS FOR STEPPING MOTORS

(75) Inventor: Jörg Hartzsch, Dortmund (DE)

(73) Assignee: Elmos Semiconductor AG, Dortmund (DE)

(*) Notice: Subject to any disclaimer, the term of this patent is extended or adjusted under 35 U.S.C. 154(b) by 0 days.

(21) Appl. No.: 09/230,693

(22) PCT Filed: Jul. 21, 1997

(86) PCT No.: PCT/EP97/03923

§ 371 Date: Jan. 29, 1999

§ 102(e) Date: Jan. 29, 1999

(87) PCT Pub. No.: WO98/05116

PCT Pub. Date: Feb. 5, 1998

(30) Foreign Application Priority Data

Jul. 30, 1996 (DE) .................................... 196 30 591
Dec. 20, 1996 (DE) .................................... 196 53 460

(51) Int. Cl.⁷ ........................................................ H02P 8/00
(52) U.S. Cl. ............................................. 318/696; 318/685
(58) Field of Search .................................. 318/685, 696, 318/254, 599

(56) References Cited

U.S. PATENT DOCUMENTS

| | | | |
|---|---|---|---|
| 4,282,471 | * 8/1981 | Budniak et al. | 318/685 |
| 4,319,174 | * 3/1982 | Cook et al. | 318/696 |
| 4,460,282 | * 7/1984 | Kanno | 368/157 |
| 4,717,866 | * 1/1988 | Gray | 318/696 |
| 4,843,292 | * 6/1989 | Ono et al. | 318/606 |
| 4,851,755 | 7/1989 | Fincher | 318/696 |
| 4,855,660 | * 8/1989 | Wright et al. | 318/696 |
| 4,929,879 | * 5/1990 | Wright et al. | 318/696 |
| 4,999,556 | * 3/1991 | Masters | 318/599 |
| 5,063,339 | * 11/1991 | Orii et al. | 318/696 |
| 5,084,661 | * 1/1992 | Tanaka | 318/685 |

FOREIGN PATENT DOCUMENTS

| | | |
|---|---|---|
| 40 35 970 | 6/1991 | (DE) . |
| 0 046 722 | 3/1982 | (EP) . |
| 0 402 220 | 12/1990 | (EP) . |
| 0 462 050 | 12/1991 | (EP) . |
| 0 574 339 | 12/1993 | (EP) . |
| 0 763 884 | 3/1997 | (EP) . |

* cited by examiner

Primary Examiner—Robert E. Nappi
Assistant Examiner—Rina I. Duda
(74) Attorney, Agent, or Firm—Collard & Roe, P.C.

(57) ABSTRACT

A process is disclosed for recognizing the step of stepping motors by analyzing the current that flows through the motor, without using any sensors. In order to overcome the problems caused by the use of a shunt resistance, the resulting current measurement errors and toggling, and to ensure an as disturbance-free and reliable operation as possible in all operation states of both unipolar and bipolar stepping motors, the disclosed process has the following steps: a defined current is transmitted to a motor winding after a reversal of the current flow direction in a first motor winding; a motor winding connection is switched with a high ohmic value; the response signal at the motor winding connection switched with a high ohmic value is sensed; the length of the response signal is evaluated. Alternatively, triggering is provoked by an external triggering signal, independently of the reversal of the current flow direction.

8 Claims, 3 Drawing Sheets

SENSORLESS STEP RECOGNITION PROCESS FOR STEPPING MOTORS

The invention relates to a process for the sensorless step recognition in connection with stepping motors by analyzing the current flowing through the motor.

Various possibilities are known according to the state of the art for determining the position of systems driven by stepping motors. For example, the position of the driven structural element can be directly detected by means of absolute-value position sensors. Even though this version is not limited to stepping motors it is eliminated in most cases because of high expenditure in terms of materials and costs.

Owing to the property of stepping motors of performing discrete steps at the time, i.e., angular increments, the position can be determined in a simple manner by monitoring, i.e., counting by means of an electronic counter the number of steps performed from a spatially defined starting point. For such position recognition it is necessary to substantially realize the following preconditions: On the one hand, the actual starting point, which, as a rule, is a final stop, has to be recognized as the starting point of the movement; and it is necessary, on the other hand, to continually monitor whether a step has in fact been performed with each current flowing through the winding of the stepping motor.

Said two preconditions can be controlled with external sensors, for example limit switches and coding disks. This, however, requires expenditure, and it is cost-intensive. Sensorless processes for step recognition are known as alternative methods, by which the feed current or the feed voltage is analyzed as current is flowing through the motor windings.

Such a method and a device for recognizing the movement of a multi-phase stepping motor are known, for example from DE 40 35 970 A1, where the voltages of two phases, i.e., the voltages applied to the motor windings are evaluated by means of a micro-computer. In detail, voltage drops occur in case of blocking in connection with the phase voltages, which have to be registered. This method is said to be insensitive to high-frequency interferences; however, it has a number of other drawbacks because recognition of the movement is possible only on multi-phase, unipolar stepping motors, but not on bipolar stepping motors. Furthermore, the voltage breaks are measurable only if the current source is a high ohmic source. Therefore, shunt resistors have to be employed, as a rule. This, of course, conditions a substantial expenditure in terms of structural elements and, moreover, an unfavorable energy balance due to the loss heat reacted on the resistor.

A process and a circuit for detecting the failure of a stepping motor to keep in step are described also in document EP 0 462 050 A1, where the current flowing through the motor windings is tapped on a shunt resistor and evaluated. As in connection with the first-mentioned published document, the problems arising to the use of the shunt resistor exist here as well. Another problem is that current measurements are relatively susceptible to errors under certain operating conditions, for example in the presence of voltage variations as they frequently occur in on-board networks of motor vehicles. This can then be compensated only by means of costly interference suppression and stabilizing measures.

Furthermore, EP 0 402 220 A1 and EP 0 574 339 A2 describe methods of step recognition in connection with stepping motors. Said methods, however, are afflicted with the aforementioned shortcomings as well.

The problem of the invention of avoiding said drawbacks arises from the shortcomings stated above. In particular, the process of the invention is to be as insensitive as possible to interference, and assure safe operation under any operating conditions. Furthermore, both unipolar and bipolar stepping motors are to be employable.

For solving said problems the invention proposes a process with the following process steps:

Transmission of a defined current to a second motor winding after reversing the direction of the flow of current in a first motor winding;

Switching of a motor winding connection of the second motor winding with a high ohmic value;

Detection of the response signal on the motor winding connection switched with a high ohmic value; and Evaluation of the duration of the response signal.

A modulated flow of current through the individual motor windings takes place in the course of execution of the process as defined by the invention. Advantages arise from the fact that no current measurements are carried out, which means no shunt resistors and no analog components needed for the evaluation are required, so that as opposed to methods known according to the state of the art, the entire circuit can be integrated in a more advantageous manner in an integrated circuit, for example on an ASIC (application specific integrated circuit).

As opposed to methods known according to the state of the art, which, for recognizing a step loss require the state of oscillation, i.e., the so-called toggling on a fixed or elastic stop means, and which are consequently not capable of recognizing full blocking of the shaft in a fixed state, the process as defined by the invention permits recognition of such operating conditions as well. In the event of toggling on the stop means, the process as defined by the invention is substantially less sensitive to line-bound interferences.

In detail, for carrying out the process as defined by the invention, a defined current is transmitted to a second motor winding after the direction of the current flowing in a first motor winding has been reversed, i.e., after a step pulse has been completed. As a rule, the amount of the current should be smaller than the typical operating current. According to a preferred implementation of the process, provision is made that the winding ends are short-circuited with each other only for a defined time. The coil current is reduced in this way to a defined value by the ohmic resistance component.

In the next step, one end of the winding of the second motor winding is switched with a high ohmic value, i.e., the current circuit is opened and the one end of the winding is connected to the potential-free input of an evaluation electronics.

In the motor winding switched to a high ohmic value and connected to the evaluation electronics, a pulse referred to as the response signal is induced due to the inductivity of said motor winding. The length of said pulse is correlated with the type of motor employed and the type of operation. The process as defined by the invention makes use of said circumstance in a way such that differences in the duration of the response pulses are already evaluated as a clear indication of a deviating rotor position, i.e., as a step loss.

Measuring the length of time of the response signal requires only relatively minor expenditure in terms of circuit technology. As opposed to absolute current measurements, measurement of the duration is at the same time largely insensitive to voltage variations in the system and other interferences.

After the length of time of the response signal has been evaluated, the second motor winding is again switched to the supply lines, so that the feed of current to the motor winding can be continued depending on the result of the preceding evaluation. The current feed cycle is usefully interrupted in this connection if any blocking is detected. A limit switch can be saved in this way in electromechanical systems; at the same time, trouble in the form of noise caused by oscillation on the mechanical stop means as well as mechanical overload are avoided.

In the process as defined by the invention, the motor winding is preferably short-circuited against ground (GND) and the length of time of the high pulse is subsequently measured after a preset time interval. Owing to the short-circuiting against ground, the motor winding current is fixed free of interference. In this wiring scheme, the response signal has a high pulse whose length of time permits supplying information about the operating condition.

One beneficial feature offered by the process as defined by the invention is its special flexibility, so that its application is equally advantageous with 1- and 2-phase current feed as well as on both bipolar and unipolar stepping motors.

The fact that neither shunt resistors nor other analog components are required, as opposed to conventional analytical methods, offers for the first time the particularly advantageous possibility to integrate all structural elements of the circuit arrangement for carrying out the process as defined by the invention in an application specific integrated circuit (ASIC). Especially in the manufacture of large series this results in distinctly favorable labor, material and production costs.

The modulation in the current feed cycle as defined by the invention has, as compared to the step pulses, a length of time so short that there is practically no measurable influence on the torque characteristic or the running properties.

A particularly advantageous alternative of the process as defined by the invention is characterized by the following process steps:
  Transmission of a defined current to a motor winding triggered by an external triggering signal.
  Switching of a motor winding connection with a high ohmic value.
  Detection of the response signal on the motor winding connection switched with a high ohmic value.
  Evaluation of the length of time of the response signal.

In the alternative process, the defined current is not triggered by reversing the direction of the current flow of a motor winding, but by any desired external triggering signal. For example, the triggering signal may originate from a signal transmitter emitting periodic pulses, which may have a higher or also a lower frequency than, for example the typical current feed pulses depending on the given requirements. The special advantage is derived from the fact that the triggering signal, which initiates the other process steps, is independent of any reversal of the direction of flow of the motor winding current feed, and consequently also not dependent upon whether the motor is actively fed with current, i.e., whether the current feed generates a driving torque or a holding moment. This offers for the first time the possibility for detecting also nonactive motor movements by means of a common stepping motor regardless of which type it is. This case is regularly the case when an external motion is impressed upon the motor that deviates from the intended current feed scheme. A distinction can be made in this connection between a number of cases: First, this comprises the movement of a motor not actively fed with current from the outside. Secondly, this comprises the forced-on movement of a motor with holding current feed; and thirdly, this involves movements forced on from the outside, with the speed or sense of rotation of such movements deviating from the preset motor current feed.

The external triggering permits measuring of the actual rotor position by means of the pulse length measuring process as defined by the invention. This means nothing else than that the stepping motor is operated as an angle-of-rotation sensor. Not only the detection of the rotational motion is made possible in this connection, but also the direction of rotation with the help of the phase position on the individual coils.

A further alternative of the process as defined by the invention, which is particularly advantageous, comprises the following process steps:
  Switching of a motor winding connection with a high ohmic value after a high-low flank has appeared in the current feed of a motor winding.
  Detection of the response signal on the motor winding connection switched with a high ohmic value.
  Evaluation of the length of time of the response signal.

With this variation of the process, the step is substantially already recognized as before for triggering an external triggering signal. As opposed to the preceding variation, however, triggering now takes place by a high-low flank or pulse of the current in a motor winding as it necessarily occurs, for example when the current flow direction is reversed in the course of motor current feed cycle. Thereafter, any desired motor winding connection is switched with time delay with a high ohmic value in the manner described above, in order to subsequently detect and evaluate the response pulse, in the manner already described in the aforegoing as well.

As with the external triggering described above, this design of the process offers the advantage that only one single motor winding is used for recognizing a step. However, no external triggering signal is required in the present case, but use is rather made again - as with the design of the process as defined by the invention in the first place of the high-low flanks present in the motor winding feed current, such flanks each being caused by the reversal of the current flow direction. The fact that the preferred possibility is available to detect after the occurrence of a high-low flank in a motor winding the response pulse in the same motor winding, whereby all other motor windings remain supplied with current completely undisturbed, results in the special advantages that the radiation of interferences is lower, and that, furthermore, a lower loss of torque occurs than when the response signal is detected on a second motor winding.

The process as defined by the invention is explained in greater detail in the following with the help of drawings, in which the following is shown in detail:

FIG. 2 shows in a representation expanded by time the current feed scheme on connections B0 and B1 of second motor winding B within the region of the current flow direction reversal on the first motor winding A, on the one hand, and in addition the curve of signal "S", which is measured as B1 is switched with a high ohmic value.

The direction of the current flowing in motor winding "A" is reversed at time t1. Following a preset delay, the winding ends B0 and B1 of the second motor winding "B" are short-circuited against ground (GND) at time t2. Following a further preset delay, connection B1 is switched with a high ohmic value at time t3, i.e., on the potential-free input of a high ohmic measuring circuit. Signal "S" is now detected on B1, said signal being a high pulse in the example shown. Said high pulse starts at time t3 and ends at time t4. The length of time of said response signal is clearly defined by the stepping motor employed and the operating conditions.

At a later point in time t5, the second motor winding B is connected again to the current feed lines, so that the current feed according to FIG. 1 an be continued. Time interval t1 to t5 is short in this connection versus the duration of a stepping pulse, so that the behavior of the torque or the execution of a step by the stepping motor are not impaired.

As soon as a deviation from the detected length of time of response signal t3–4 occurs, this is an indication that no complete step was carried out in the preceding reversal of the direction of flow of the current in the first motor winding, i.e., that a blockage is present. This may be the case, for example if the stepping motor has driven against a stop means.

Figure 1:
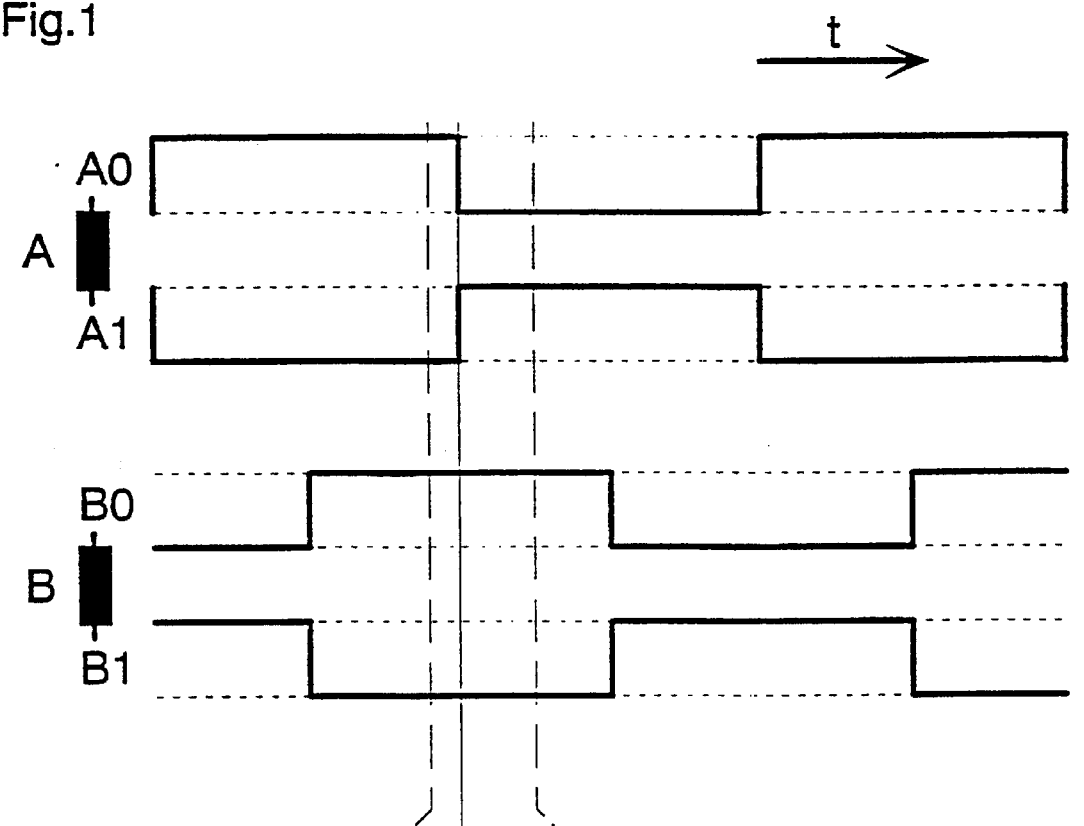
FIG. 1 is a typical current feed plan of the motor windings.
Figure 2:
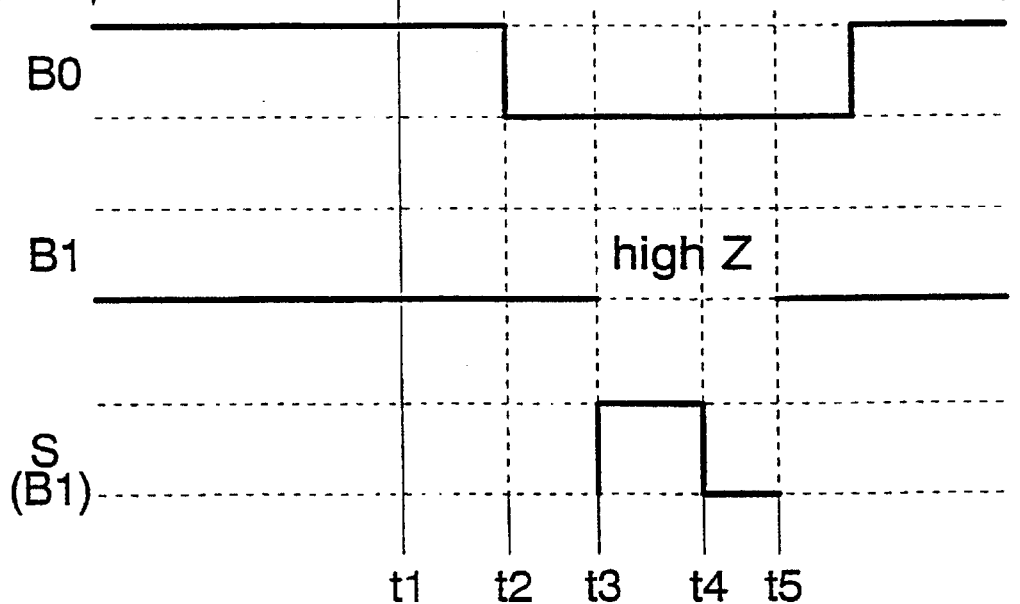
FIG. 2 shows an enlarged representation of the time cutout from FIG. 1 by dashed lines.
Figure 3:
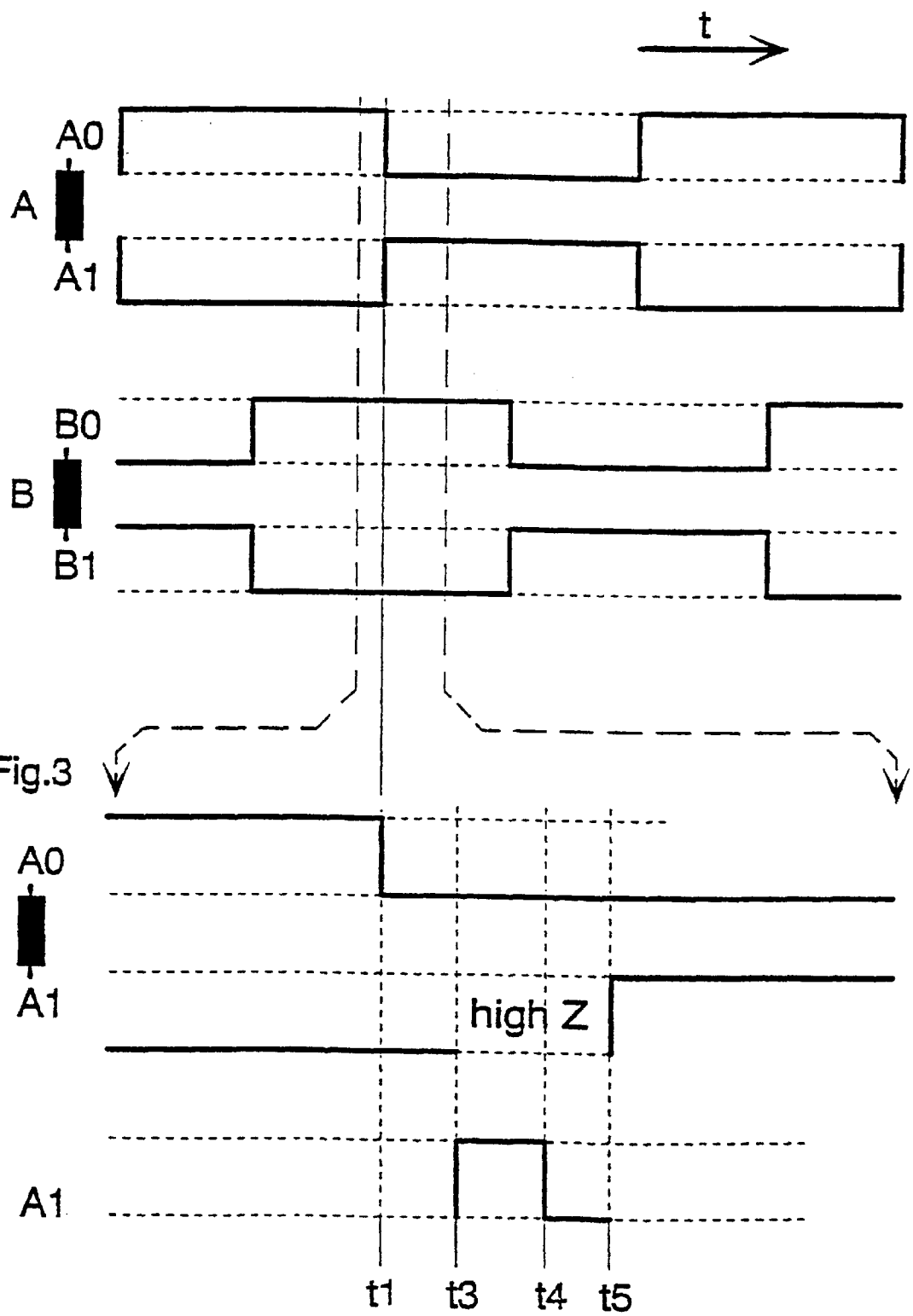
FIG. 3 shows an enlarged representation of the time cutout from FIG. 1 shown by dashed lines, in connection with a second design of the process as defined by the invention.

FIG. 3 shows by the same representation as in FIG. 2 a cutout from the wiring diagram according to FIG. 1. As opposed to the process according to FIG. 2, after a high-low flank has appeared at time t1 on winding connection A0, winding connection A1 of the same motor winding A is switched with a high ohmic value at time t3. The response pulse is then detected again between points in time t3 and t4 as explained already above. The current feed of motor winding A is continued as usual at a later time t5.

In the last-described procedure as defined by the invention, the other motor winding B is fed with current in a completely undisturbed manner. This will practically not reduce the torque in the course of detection of the response pulse, and, furthermore, the radiation of interferences is lower.

The process as defined by the invention is equally applicable in the full step, half step and micro-step processes.

Figure 4:
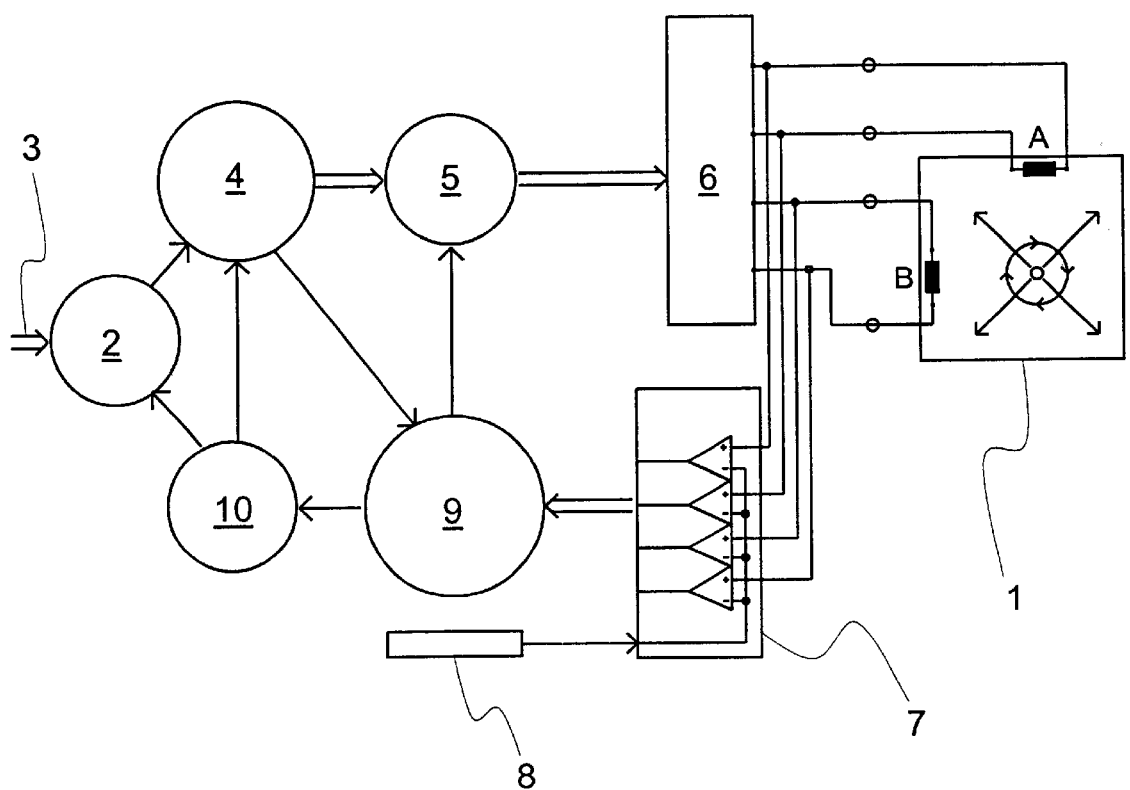
FIG. 4 shows a block diagram of a stepping motor control operating as defined by the invention.

FIG. 4 shows a block diagram of a stepping motor control operating as defined by the invention. Shown is a bipolar stepping motor 1 comprising a first motor winding A and a second motor winding B. A motor position control circuit 2 receives an external command 3 containing a statement of the position into which the stepping motor 1 is to be driven. The motor position control circuit 2 transmits step by step commands to a stepping pattern logic 4 for the steps to be carried out successively. The stepping pattern logic 4 calculates the new current feed condition based on the preceding current feed condition of the motor windings and based on the command received from the motor position control circuit 2.

A motor winding driver logic 5 generates the time sequence of the step current feed pulses according to FIG. 1 when reversing from the preceding current feed condition to the new current feed condition. A motor winding current feed circuit 6 is activated by the motor winding driver logic 5, which supplies the winding connections with current according to the preset time sequence, with the effect that the motor each time turns by one step in the desired direction.

One of the motor windings A or B is short-circuited by the motor winding current feed circuit 6 for a defined length of time after a reversal of the direction of the current feed of the motor winding has occurred in the other motor winding B or A.

Following short-circuiting for a defined length of time, the respective motor winding connection is switched to high resistance by the motor winding current feed circuit 6. This generates a measuring pulse that is converted into a digital signal by means of a trigger circuit 7 consisting of four comparators. A preset reference voltage is applied to the comparators for said purpose by a voltage source 8. The length of the digital measuring pulse is determined by a feedback analysis logic 9. The feedback analysis logic 9 signals to the motor winding driver logic 5 when the measuring pulse has ended. The motor winding connections A, B are thereupon supplied with current again in the conventional manner.

Furthermore, the lengths of successive measuring pulses of the different motor winding connections A, B are compared with each other by the feedback analysis logic 9, whereby a signal is triggered if deviations between the duration of successive measuring pulses occur. A step error analysis logic 10 stores the error signals registered by the feedback analysis logic 9 in a stack. The stored information is evaluated by the step error analysis logic 10, whereby in particular interference caused by mechanical load changes as well as by supply voltage currents etc. is filtered out.

After a defined number of error signals, the step error analysis logic 10 recognizes a blocking of the motor. When a blockage is recognized, this is signaled to the motor position control circuit 2 in order to stop the run of the motor, if need be, so that mechanical destruction and generation of noise are avoided.

The realization of the process as defined by the invention is relatively simple in terms of circuit technology because no A-D-converters are required,but only a simple pulse-counting circuit is needed, permitting measurement of the length of time of response pulse t3–t4.

What is claimed is:

1. A method of sensorless step recognition in connection with stepping motors by analysis of the motor current feed, comprising the following steps:

impressing a defined current on a second motor winding by short-circuiting the second motor winding for a defined length of time following a reversal of a direction of the current of the motor winding current feed of a first motor winding;

switching a motor winding connection of the second motor winding to high resistance;

detecting a response signal on the motor connection switched to high resistance; and evaluating the duration of the response signal.

2. The method according to claim 1, wherein the step of impressing a defined current on a second motor winding further comprises short circuiting the second motor winding against ground, and said step of evaluating the duration of the response signal includes measuring the length of this response signal according to a preset time interval.

3. The method according to claim 1, further comprising the step of providing a single-phase current feed to carry out the process.

4. The method according to claim 1, further comprising the step of providing a two-phase current feed to carry out the process.

5. The method according to claim 1, further comprising the step of providing a bipolar stepping motor to carry out the process.

6. The method according to claim 1, further comprising the step of providing a unipolar stepping motor to carry out the process.

7. A circuit arrangement for carrying out the method according to claim 1, further comprising the step of integrating all of the components in an ASIC (Application Specific Intergrated Circuit).

8. A method of sensorless step recognition in connection with stepping motors by analysis of the motor current feed, comprising the following steps:

switching a motor winding connection to high resistance after a high-low flank or pulse has appeared in the current feed of a motor winding; and detecting a response signal by time-delayed tapping on the motor winding connection switched to high resistance, on which a high-low flank or pulse has previously appeared.

* * * * *